UNITED STATES PATENT OFFICE.

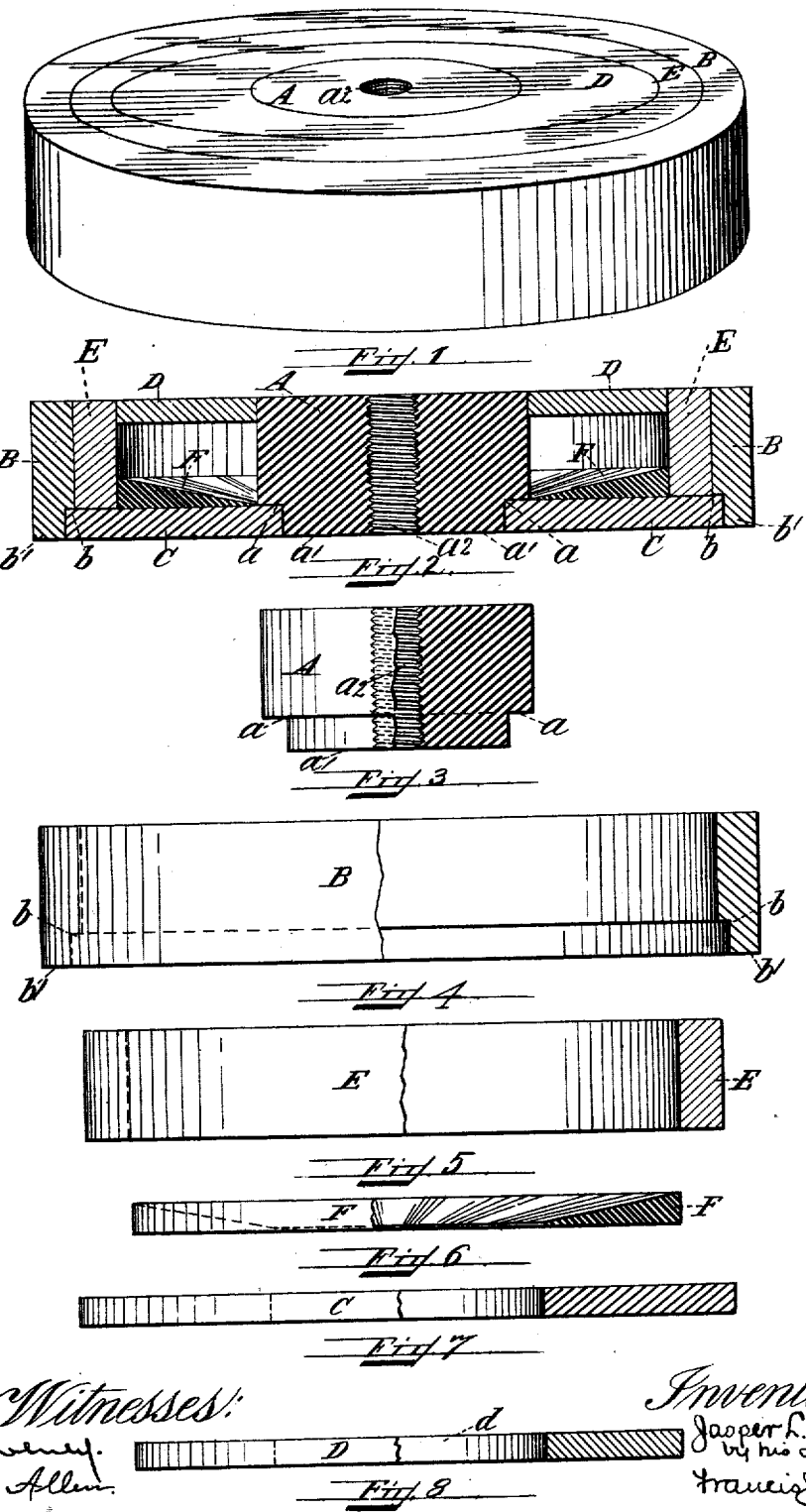

JASPER L. SACKETT, OF MELROSE, MASSACHUSETTS.

MOLD.

No. 913,057.　　Specification of Letters Patent.　　Patented Feb. 23, 1909.

Application filed April 8, 1905. Serial No. 254,510.

*To all whom it may concern:*

Be it known that I, JASPER L. SACKETT, a citizen of the United States, residing at Melrose, in the county of Middlesex and State of Massachusetts, have invented a new and useful Mold, of which the following is a specification, reference being had therein to the accompanying drawings.

My invention relates to molds for vulcanizing rubber and for other purposes for which molds are suitable and the object of my invention is to produce a mold composed of parts or sections for which other parts or sections may be substituted in order to change the size or shape of the mold and avoid the necessity of having a complete mold for each additional size or shape required.

Heretofore, molds have been so constructed that each mold gave a particular size and shape to the molded substance and any change in the size or form, however slight, required a new mold and rendered the old one useless. By constructing molds in sections as hereinafter described, I am enabled to change the form or size of the mold by adding one or more additional parts or by substituting for one or more of the sections, other sections.

The following is a clear description of my invention, reference being made to the accompanying drawings, in which:—

Figure 1 is a perspective view of a complete circular mold; Fig. 2 is a vertical cross section; Fig. 3 is a side elevation of the stud, partly in section; Fig. 4 is a side elevation of the shell, partly in section; Fig. 5 is a side elevation of the shell-ring, partly in section; Fig. 6 is a side elevation of a beveled stud-plate, partly in section; Fig. 7 is a side elevation of the shell-plate, partly in section; and Fig. 8 is a side elevation of the stud-plate, partly in section.

Similar letters refer to similar parts throughout the several views.

The essential parts of my improved mold are a central core, A, called the stud; an exterior portion or shell, B; a lower plate, C, called the shell-plate and an upper plate, D, known as the stud-plate. These four parts constitute a complete mold. The stud, A, has a right-angled recess, $a$, cut on the circumference of its base, $a^1$, and the shell, B, has a corresponding recess, $b$, cut on the inside edge of its base $b^1$; the purpose of these two recesses $a$ and $b$, being to receive the shell plate, C, which forms the base of the mold, and to prevent the plate, C, being pressed upward between the shell and the stud. The stud-plate D, is a flat circular plate, provided with a central orifice, $d$, adapted to receive and fit closely around the head of the stud, A, and having its outer circumference of a size adapted to fit closely within the shell. The stud-plate, D, can be moved up and down between the stud and the shell and is not retained by any shoulders as is the case with the shell-plate.

If desired, recesses similar to those cut upon the bases of the shell and the stud might be cut upon the tops of the shell and the stud in order to limit the downward movement of the stud-plate but for molds where the substance to be molded is first to be pressed, my present construction is better, because when the interior of the mold is filled, the stud-plate is adjusted and by applying pressure on the top of the mold, the stud-plate is forced downward until its upper surface is in the same plane as the upper surfaces of the stud and shell and a uniform size of the molded substance is always obtained. The stud A is shown, provided with a threaded bore, $a^2$, which may be used for the purpose of mounting the mold on a lathe should it be desired.

If desired, the shell, B, and the shell-plate, C, may be made in one piece as the stud, A, in all cases has the same size base adapted to fit the central orifice in the shell-plate, C.

In order to secure various sized molds, it is unnecessary to make a complete mold for each size as one stud may be used with any number of different sized shells, it being required of course in each case to have corresponding shell-plates and stud-plates; and likewise one shell may be used in combination with different sized studs, stud-plates and shell-plates. The shapes and sizes of my molds can still further be changed and regulated by employing additional parts, two varieties of which are illustrated in Figs. 5 and 6. Fig. 5 shows a plain ring, E, which fits inside the shell and which may be made of any thickness and any number of the rings can be used, one fitting within another, thus regulating the outside diameter of the substance to be molded. Similar rings of varying diameter called stud-rings may be made to fit around the stud but where the molds are to be subjected to heat, it is preferable to use shell-rings for the reason that stud-rings are apt to bind on the stud and become set owing to the expansion of the stud when heated. Fig. 6 shows a beveled stud-plate, F, which serves to give the molded substance a beveled base, or top according to its position in the mold.

When using these molds, any size or shape mold can be formed by selecting and combining the proper sized and shaped parts. In the drawings, I have shown a mold for molding articles in ring form, but the form of the mold is immaterial and they may be made square, rectangular and in other form without departing from the spirit of my invention and it is equally evident that additional parts may be added to effect the shape or size of the molded substance. After being used the mold is then separated into its various parts.

Obviously my invention may be embodied in many different forms without departing from the spirit thereof and I desire to claim my invention in the broadest manner legally possible.

What I claim is:

1. In a mold, the combination of a central portion or stud, an outer shell, a beveled stud-plate, and parallel transverse plates provided with central orifices to receive and hold the ends of said stud; said upper transverse plate fitting within said shell and adapted to move upwardly and downwardly within said shell to permit the contents of the mold to be compressed.

2. In a mold, the combination of a central portion or stud A, an outer shell B, a beveled stud-plate F, and parallel transverse plates C and D provided with central orifices to receive and hold the ends of said stud A; said upper transverse plate D fitting within said shell B and adapted to move upwardly and downwardly within said shell B to permit the contents of the mold to be compressed to any desired extent.

In testimony whereof I affix my signature in presence of two witnesses.

JASPER L. SACKETT.

Witnesses:
CHARLES F. RICHARDSON,
E. F. UNIAC.